US010401667B2

(12) United States Patent
Que

(10) Patent No.: US 10,401,667 B2
(45) Date of Patent: Sep. 3, 2019

(54) LIQUID CRYSTAL DISPLAY DEVICE HAVING ENCLOSURE SNUGLY ENGAGED WITH DISPLAY PANEL

(71) Applicant: Shenzhen China Star Optoelectronics Technology Co., Ltd., Shenzhen, Guangdong (CN)

(72) Inventor: Chengwen Que, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 16/125,976

(22) Filed: Sep. 10, 2018

(65) Prior Publication Data

US 2019/0004364 A1 Jan. 3, 2019

Related U.S. Application Data

(63) Continuation of application No. 15/635,255, filed on Jun. 28, 2017, now Pat. No. 10,120,225.

(51) Int. Cl.
*G02F 1/1333* (2006.01)

(52) U.S. Cl.
CPC .................. *G02F 1/133308* (2013.01); *G02F 2001/13332* (2013.01); *G02F 2001/133317* (2013.01); *G02F 2201/46* (2013.01); *G02F 2201/56* (2013.01); *G02F 2202/28* (2013.01)

(58) Field of Classification Search
CPC ........... G02F 1/133308; G02F 2201/46; G02F 2001/133317; G02F 1/1333; G02F 2001/133354; G02F 2001/133314; G02F 1/133608; G02F 2001/133311; G02F 2001/13332; G02F 2001/133322; G02F 2001/133325; G02F 2001/133328; G02F 2001/133331; G02F 2001/133334; G02F 1/133305; G02F 1/136277; G02F 2001/133302; G02F 2001/133368;
(Continued)

(56) References Cited

U.S. PATENT DOCUMENTS

2002/0125815 A1* 9/2002 Wakita .............. G02F 1/133308 313/491
2004/0179150 A1* 9/2004 Lai .................... G02F 1/133308 349/58
(Continued)

*Primary Examiner* — Shan Liu
(74) *Attorney, Agent, or Firm* — Andrew C. Cheng

(57) ABSTRACT

An enclosure for mounting a substrate of a liquid crystal display, comprises a base frame providing a bottom wall and a supporting platform extending from the bottom wall, the base frame further including a first peripheral wall extending upward. A bezel frame is interengaged with the base frame, and includes a lateral wall corresponding to the first peripheral wall of the base frame, and defines a retaining gap between the lateral wall of the bezel frame and the supporting platform of the base frame. Wherein the bezel includes at least a first resilient tab, configured with a first prong, and a second resilient tab, configured with a second prong, and symmetrically opposite to the first prong, formed on the lateral wall of the bezel frame and extending into the retaining gap, wherein each of the first and second prongs forms an obtuse angle with the lateral wall.

8 Claims, 5 Drawing Sheets

(58) Field of Classification Search
CPC . G02F 2201/56; H01L 27/12; H01L 27/1203; H01L 27/1218; H01L 21/02367
USPC ............................................ 349/58–60, 158
See application file for complete search history.

(56) References Cited

U.S. PATENT DOCUMENTS

| | | | | |
|---|---|---|---|---|
| 2012/0242926 | A1* | 9/2012 | Hsu | G02F 1/133308 349/58 |
| 2014/0055710 | A1* | 2/2014 | Yu | G02F 1/133608 349/58 |
| 2015/0362787 | A1* | 12/2015 | Yuan | G02F 1/133308 349/58 |

* cited by examiner

LIQUID CRYSTAL DISPLAY DEVICE HAVING ENCLOSURE SNUGLY ENGAGED WITH DISPLAY PANEL

CROSS REFERENCE TO RELATED APPLICATIONS

This is a continuation application of co-pending patent application Ser. No. 15/635,255, which is submitted on Jun. 28, 2017, entitled "Liquid Crystal Display Device Having Enclosure Snugly Engaged with Display Panel", and which is a continuation-in-part application of patent application Ser. No. 14/437,819, filed on Apr. 22, 2015, entitled "LIQUID CRYSTAL DEVICE, THE FRAME AND THE LIQUID CRYSTAL PANEL THEREOF", which is a national stage of PCT Application Number PCT/CN2014/090019, filed on Oct. 31, 2014, claiming foreign priority of Chinese Patent Application Number 201410567956.X, filed on Oct. 22, 2014.

BACKGROUND OF THE INVENTION

Field of the Invention

The present invention relates to an enclosure, and especially to an enclosure used in liquid crystal display device. The enclosure is configured with a bezel frame and a base frame, and at least a pair of resilient prongs configuring a resilient dovetail-shaped tab in the bezel frame to snugly and efficiently inter-engage with a corresponding dovetail-shaped retaining gap defined in an edge of a substrate.

Related Arts

With the growing competition of the liquid crystal display devices, it is more and more important to come out with differentiated designs. For instance, super thin and narrowed frame is one of the trends in design liquid crystal display device.

As shown in FIG. 1, the super thin/narrow frame LCD 10 includes a front frame 1, a liquid crystal panel 2, a plurality of optical components 4, and a base frame 5. The front frame 1 includes a bezel 6 for pressing the liquid crystal panel 2 via buffering components so as to shield an end portion 7 of the liquid crystal panel and to position the liquid crystal panel 2 therein. The front frame 1 further includes a lateral wall 8 perpendicular to the bezel 6. The front frame 1 is attached to the lateral wall 8 through screws or equivalents.

As the above-mentioned trend, the bezel 6 may increase the thickness (H) of the liquid crystal panel 2, while the lateral wall 8 may increase the thickness (D), which is detriment to the super thin and narrowed design.

CN 102809836A issued to Jia et al., US Pat Publication No 2002/0125815 submitted by Wakita, and CN203350562U all disclose related designs.

SUMMARY OF THE INVENTION

It is an object of the present invention to provide a novel frame configuration in which a retaining gap is defined under a bezel portion of the frame so as to snugly receive a substrate of a display panel in a way that an upper surface of the display panel is flushed to a top surface of the bezel so as to reach a compact, thin and narrowed design of liquid crystal display device.

According to one aspect of the present invention, the retaining gap is provided with at least of resilient prongs configuring a dovetail-shaped tab, and an edge of the substrate is defined with a dovetail-shaped positioning slot corresponding to the dovetail-shaped tab. When the edge of the substrate is inserted and retained within the retaining gap of the frame, an interference interengagement is created between the dovetail-shaped tab and the dovetail-shaped positioning slot.

DETAILED DESCRIPTION OF THE PREFERRED EMBODIMENTS

Embodiments of the invention will now be described more fully hereinafter with reference to the accompanying drawings, in which embodiments of the invention are shown.

Figure 1:
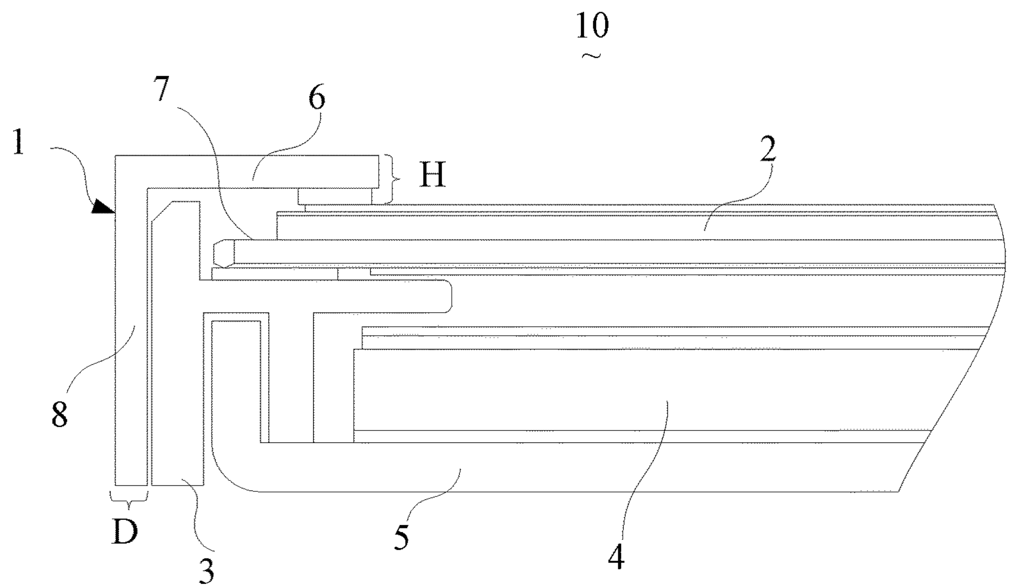
FIG. 1 is a cross section view of a conventional liquid crystal display (LCD).
Figure 2:
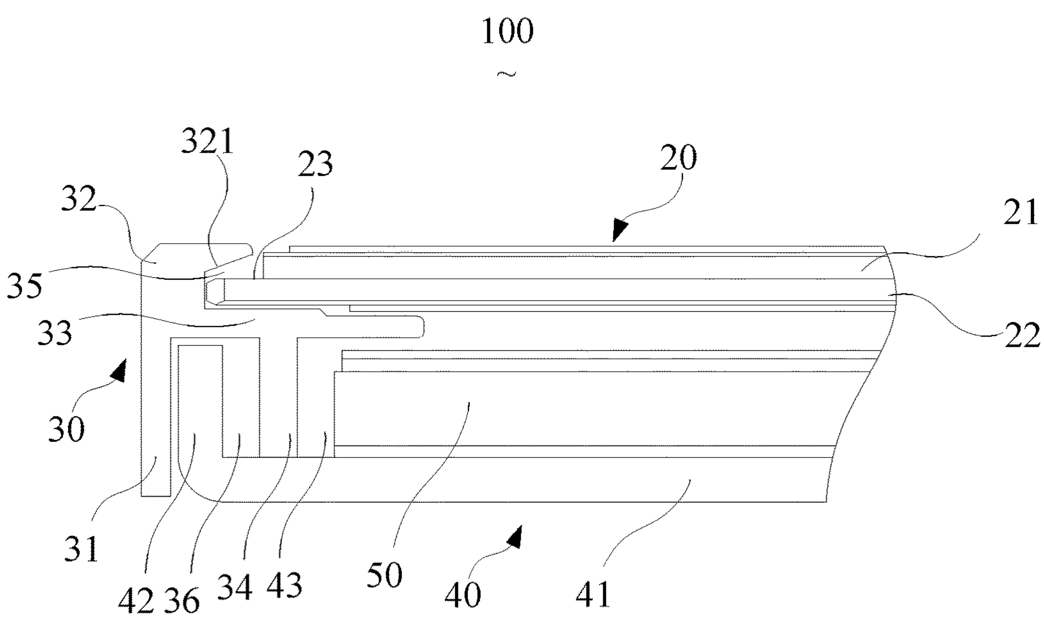
FIG. 2 is a partial cross sectional view of the LCD made in accordance with a first embodiment of the present invention.

Referring to FIG. 2, a partial cross sectional view of the LCD made in accordance with a first embodiment of the present invention is shown. The liquid crystal display device 100 includes a liquid display panel module 20, a bezel fame 30, a base frame 40, and an optical component 50. The bezel frame 30 and the base frame 40 jointly configure into an enclosure to house the liquid display panel module 20 and the optical components 50.

The bezel frame 30 is configured with a lateral wall 31, a bezel 32, a supporting platform 33, and a mounting portion 34. The bezel 32 extends from a top end of the lateral wall 31. In this embodiment, the supporting platform 33 extends also from the lateral wall 31 and jointly define a retaining gap 35 with the bezel 32. The bezel 32 is preferably formed with a lead-in surface 321. The mounting portion 34 extends downward from the supporting platform 33. The mounting portion 34 is in parallel with respect to the lateral wall 31 such that a retaining trough 36 is defined therebetween.

The liquid crystal display panel module 20 includes a thin-film transistor (TFT) substrate 22 and a color filter (CF) substrate 21 mounted on top of the TFT substrate 22 which is larger than the CF substrate 21 in dimension. A lead-in edge 23 is spared in the liquid crystal display panel module 20 and which can be readily inserted into the retaining gap 35 in a way such that a top surface of the liquid crystal display panel module 20 is flushed with a top surface of the bezel 32. The TFT substrate 22 is defined with a gluing area, and the arrangement of the supporting platform 33, the lead-in surface 321 of the bezel 32 can be readily used to control the flowing direction of the glue in that gluing area. Specially, the lead-in surface 321 will preferably lead the glue to flow out of the retaining gap 35 and settle in an area between the CF substrate 21 and the lead-in surface 321 of the bezel 32.

The base frame 40 includes a bottom wall 41, a first peripheral wall 42 extending upward from the bottom wall 41. A mounting space 43 is defined by the bottom wall 41, the first peripheral wall 42 and the supporting platform 33 for housing the optical components 50 therebetween. The first peripheral wall 42 is properly fitted into the retaining trough 36 defined between the lateral wall 31 and the mounting portion 34 so as to keep all elements in correct and intended positions. It should be noted that the mounting portion 34 can be omitted and replaced by the first peripheral wall 42 and the supporting platform 33.

Figure 3:
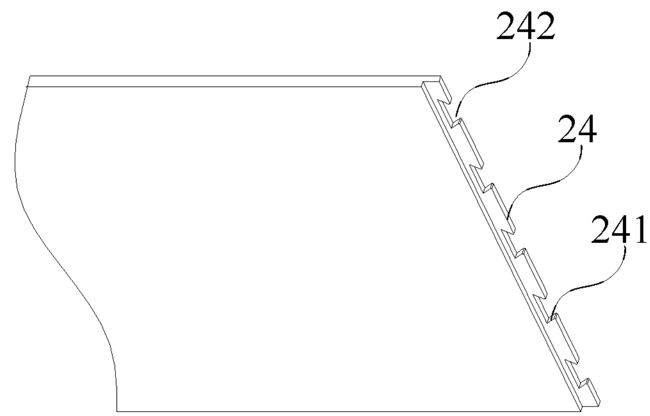
FIG. 3 is a partial, perspective view of FIG. 2.
Figure 7:
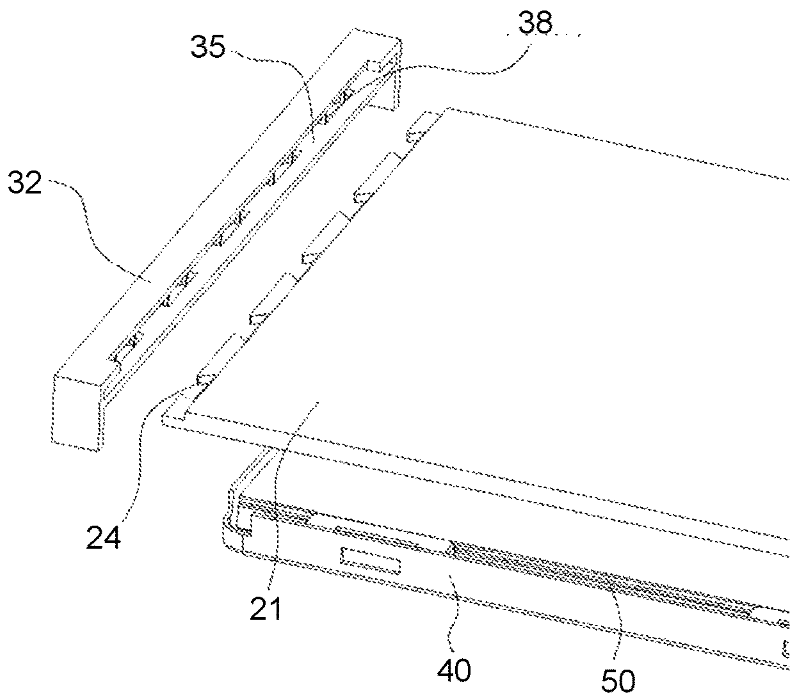
FIG. 7 is an illustrational view showing the display module is assembling toward the frame.
Figure 8:
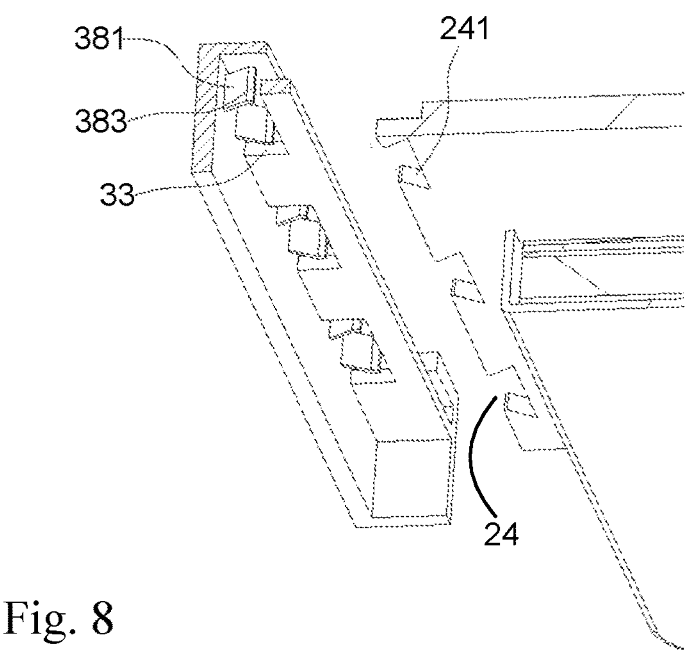
FIG. 8 is similar to FIG. 7, while viewing from bottom direction.
Figure 9:
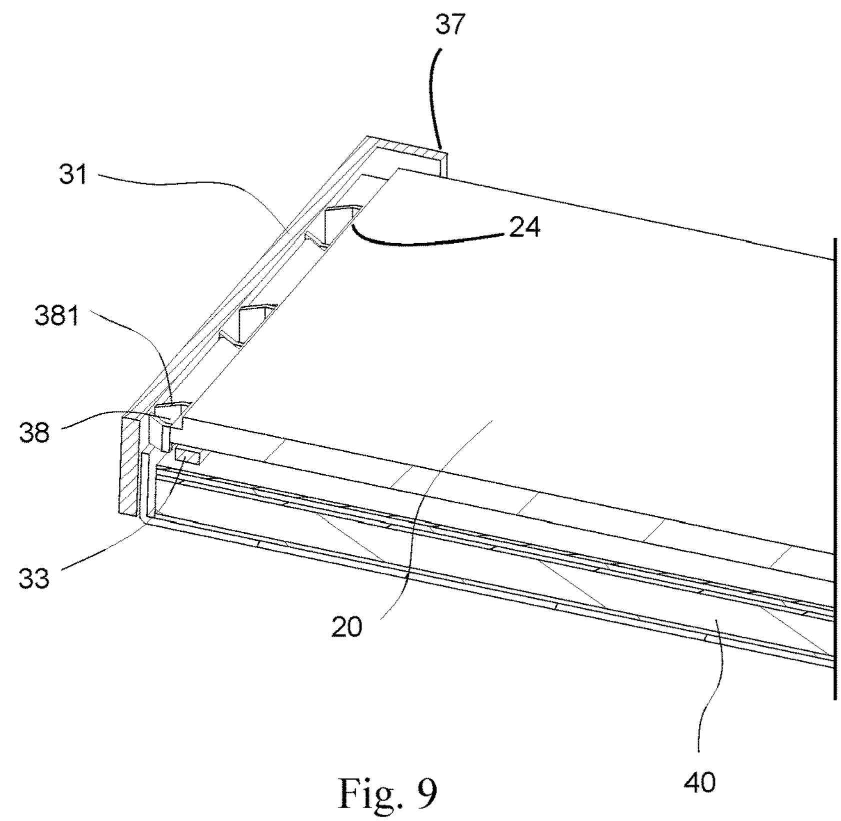
FIG. 9 is an illustration view with the bezel removed to illustrate the engagement between the dovetail-shaped tabs and the dovetail-shaped positioning slots.
Figure 10:
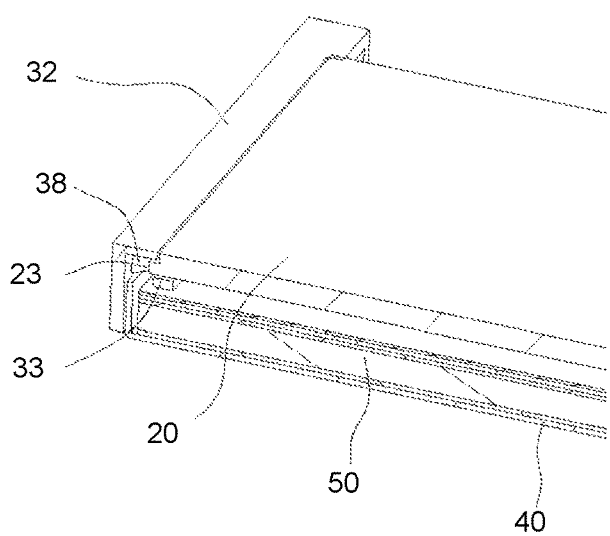
FIG. 10 is a partial and perspective view showing the compete assembly.

Referring now to FIG. 3, along with FIGS. 7, 8 and 9, the lead-in edge 23 of the TFT substrate 22 is defined with a plurality of positioning slots 24 jointly defined by a pair of inclined surfaces 241 therein. The positioning slot 24 has a dovetail-shaped configuration, i.e. having a narrow mouth, while a larger pocket therein.

Figure 4:
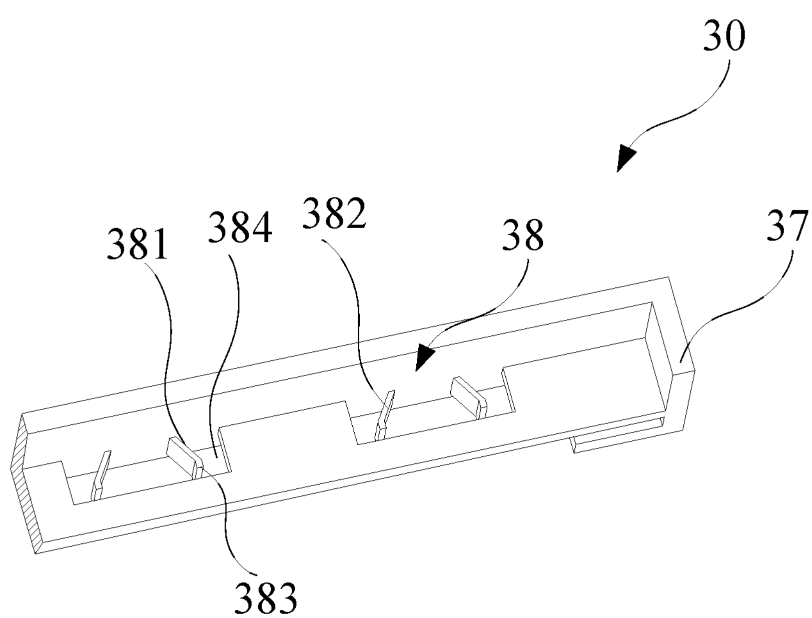
FIG. 4 is a partial, perspective view of the frame of FIG. 2, viewing from bottom of the frame.

Referring to FIG. 4, again along with FIGS. 7, 8, 9 and 10. It should be noted that FIG. 4 is viewed from a bottom direction, i.e. a direction opposite to the bezel 32. A plurality of resilient tabs 38 extends from the lateral wall 31 into the retaining gap 35. An end wall 37 is connected to the end of the lateral wall 31. The end wall 37, the bezel 32 and the supporting platform 33 are integrally formed together.

The resilient tab 38 is configured by a first prong 381 and a second prong 382. Each of the first and second prongs 381, 382 is defined with a lead-in 383. The first and second prongs 381, 382 extend from the lateral wall 31 into the retaining gap 35 so as to meet and engage with the positioning slot 24 of the lead-in edge 23 of the TFT substrate 22. Every two adjacent resilient tabs 38 jointly a receiving space 384. The interengagement between the resilient tabs 38 and the positioning slots 24 can be readily appreciated by the disclosure of FIG. 9. Since both the resilient tabs 38 and the positioning slots 24 are configured into the dovetail-shaped, as a result, a reliable and compact interengagement therebetween can be ensured and benefited. The arrangement of the lead-in 383 will ensure the engagement smooth and easy. As any skilled in the arts can readily appreciate the convenience of this arrangement, it is believed that no detailed description is needed.

Figure 5:
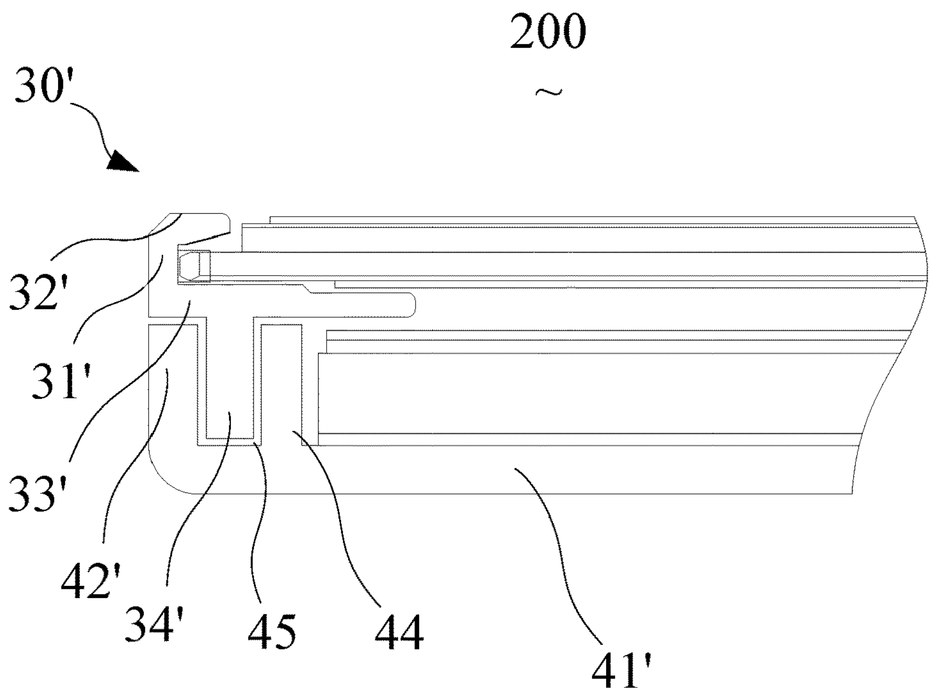
FIG. 5 is a partial cross sectional view of the LCD in accordance with a second embodiment of the present invention.

Referring to FIG. 5, a partial cross sectional view of the LCD in accordance with a second embodiment of the present invention is disclosed.

The liquid crystal display device 200 is substantially similar to the liquid crystal display device 100. The difference resides the engagement or assembly between the bezel frame 30' and the base frame 40'. In this embodiment, the base frame 40' is formed with a second peripheral wall 44 and jointly defining a mounting trough 45 along with the first peripheral wall 42' so as to securely receive the mounting portion 34' of the bezel frame 30'.

It can be readily appreciated from FIG. 5 as in this embodiment, the lateral wall 31' is also flushed with the first peripheral wall 42. The lateral wall 31' can be shortened as the mounting portion 34' is snugly positioned within the mounting trough 45.

It should be noted that the lateral wall 31', the supporting platform 33' and the mounting portion 34 can be made individually, and then assembled together; or alternatively, they can be integrally formed.

Figure 6:
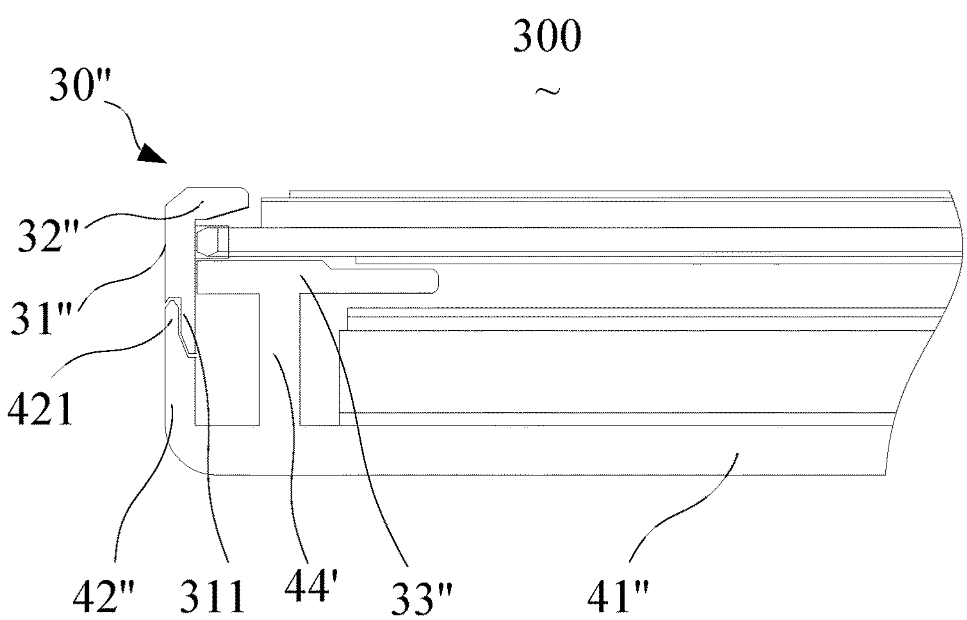
FIG. 6 is a partial cross sectional view of the LCD in accordance with a third embodiment.

Referring to FIG. 6, a partial cross sectional view of the LCD in accordance with a third embodiment of the present invention is disclosed.

The liquid crystal display device 300 is substantially similar to the liquid crystal display device 200. The difference again resides the engagement or assembly between the bezel frame 30" and the base frame 40".

In this embodiment, the supporting platform 33" is integrally formed with the base frame 40" while extending upward to define the retaining gap 35 (see FIG. 2 for reference), i.e. the supporting platform 33" is integrally formed with the second peripheral wall 44'. As shown in FIG. 6, the supporting platform 33" is located on a top end of and perpendicular with the second peripheral wall 44' so that the supporting platform 33" and second peripheral wall 44' form a T shape cross-section. One side of the supporting platform 33" is in direct contact with the lateral wall 31". In addition, the lateral wall 31" is aligned with the first peripheral wall 42".

In this embodiment, the base frame 40' is formed with a second peripheral wall 44 and jointly defining a mounting trough 45 along with the first peripheral wall 42' so as to securely receive the mounting portion 34' of the bezel frame 30'. Both the lateral wall 31" and the first peripheral wall 41" is defined with mating joints 311 at their mating ends for readily and convenient engagement.

In this third embodiment, the bottom wall 41", the first peripheral wall 42", the second peripheral wall 44" and the supporting platform 33" can be formed individually, and then assembled together, or they can be integrally formed together. It is noted that the lateral wall 31" of the bezel frame 30" is preferably formed separately.

From the above descriptions of the preferable embodiments, it can be readily appreciated that with the interengagement between the retaining tabs and the positioning slots between the bezel frame and the TFT substrate, the purpose and goal of the present invention can be properly achieved. Mostly importantly, the top surface of the display panel is flushed with the top surface of the bezel through this effective arrangement. Other benefits can be readily achieved as well.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

The invention claimed is:

1. An enclosure for mounting a substrate of a liquid crystal display, comprising:

a base frame, the base frame comprising:

- a bottom wall;
- a first peripheral wall extending upward from the bottom wall;
- a second peripheral wall extending upward from the bottom wall; and a supporting platform located on a top end of and integrally formed with the second peripheral wall, wherein the supporting platform is perpendicular with the second peripheral wall so that the supporting platform and second peripheral wall form a T shape cross-section;

a bezel frame interengaged with the base frame, comprising a lateral wall corresponding to the first peripheral wall of the base frame, and defining a retaining gap between the lateral wall of the bezel frame and the supporting platform of the base frame;

wherein the bezel frame comprises a first resilient tab, configured with a first prong, and a second resilient tab, configured with a second prong, and symmetrically opposite to the first prong, formed on the lateral wall of the bezel frame and extending into the retaining gap, wherein each of the first and second prongs forms an obtuse angle with the lateral wall;

wherein joints are formed on mating ends of the bezel frame and the first peripheral wall of the base frame; and wherein one side of the supporting platform is in direct contact with the lateral wall.

2. The enclosure as recited in claim 1, wherein the first and second prongs jointly configure a dovetail-shaped configuration.

3. The enclosure as recited in claim 1, wherein the lateral wall of the bezel frame is aligned with the first peripheral wall of the base frame.

4. A liquid crystal display comprising: a liquid crystal display panel and an enclosure for mounting the liquid crystal display panel, wherein the enclosure comprises:

a base frame, the base frame comprising:

a bottom wall;

a first peripheral wall extending upward from the bottom wall;

a second peripheral wall extending upward from the bottom wall; and a supporting platform located on a top end of and integrally formed with the second peripheral wall, wherein the supporting platform is perpendicular with the second peripheral wall so that the supporting platform and second peripheral wall form a T shape cross-section;

a bezel frame interengaged with the base frame, comprising a lateral wall corresponding to the first peripheral wall of the base frame, and defining a retaining gap between the lateral wall of the bezel frame and the supporting platform of the base frame;

wherein the bezel frame comprises a first resilient tab, configured with a first prong, and a second resilient tab, configured with a second prong, and symmetrically opposite to the first prong, formed on the lateral wall of the bezel frame and extending into the retaining gap, wherein each of the first and second prongs forms an obtuse angle with the lateral wall;

wherein joints are formed on mating ends of the bezel frame and the first peripheral wall of the base frame; and wherein one side of the supporting platform is in direct contact with the lateral wall.

5. The liquid crystal display as recited in claim 4, wherein the first and second prongs jointly configure a dovetail-shaped configuration.

6. The liquid crystal display as recited in claim 4, wherein the lateral wall of the bezel frame is aligned with the first peripheral wall of the base frame.

7. The liquid crystal display as recited in claim 4, wherein the liquid crystal display panel comprises a thin-film transistor (TFT) substrate and a color filter (CF) substrate mounted on top of the TFT substrate which is larger than the CF substrate in dimension; the TFT substrate has a leading edge defining with a first positioning slot corresponding to the first resilient tab and a second positioning slot corresponding to the second resilient tab.

8. The liquid crystal display as recited in claim 7, wherein the first resilient tab is configured by two first prongs, the two first prongs are separate and spaced from each other such that the two first prongs are respectively and independently engageable with two opposite sidewalls of the first positioning slot of the substrate to create the interengagement between the first resilient tab and the first positioning slot; the second resilient tab is configured by two second prongs, the two second prongs are separate and spaced from each other such that the two second prongs are respectively and independently engageable with two opposite sidewalls of the second positioning slot of the substrate to create the interengagement between the second resilient tab and the second positioning slot.

* * * * *